Dec. 1, 1936. W. S. AIKEN 2,062,737
PAPER CUTTING APPARATUS
Filed Nov. 27, 1935 4 Sheets-Sheet 3

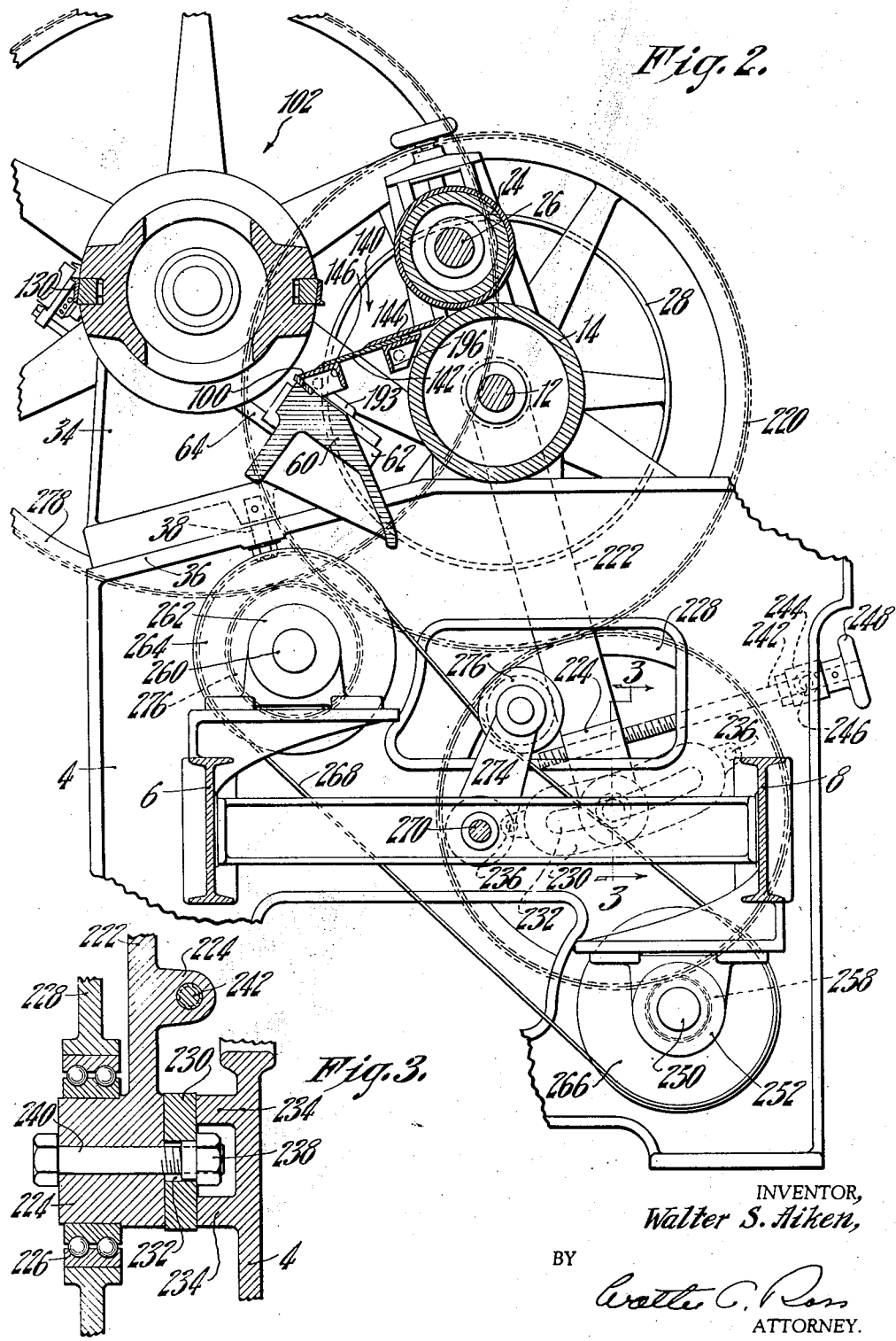

INVENTOR,
Walter S. Aiken,
BY
ATTORNEY.

Dec. 1, 1936.  W. S. AIKEN  2,062,737
PAPER CUTTING APPARATUS
Filed Nov. 27, 1935  4 Sheets-Sheet 4
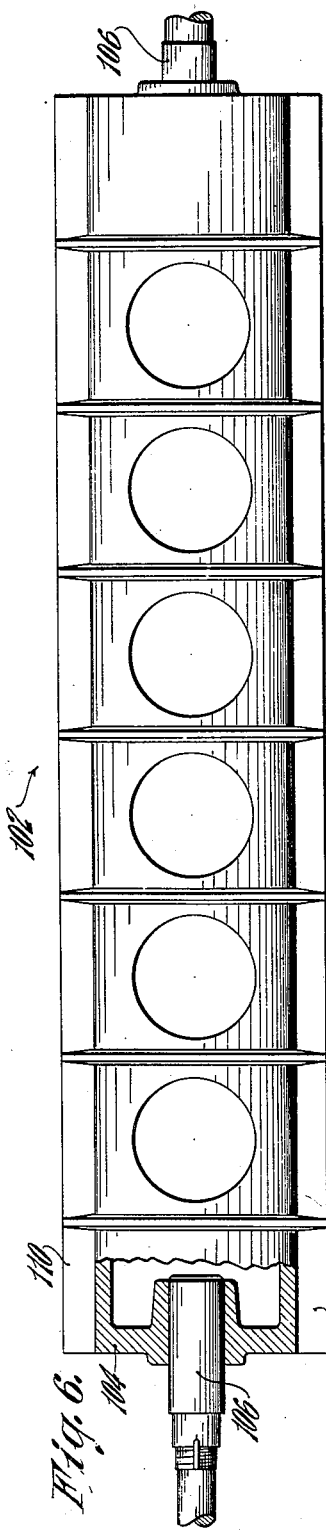
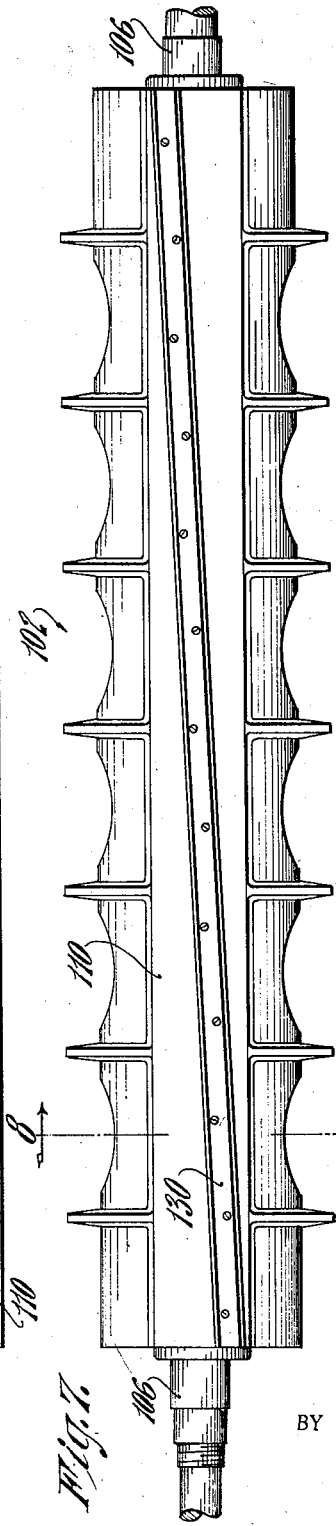
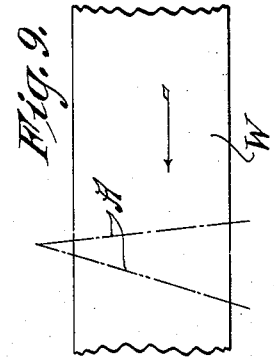
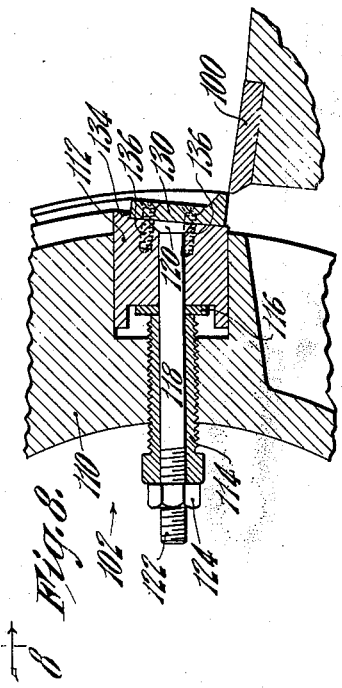
INVENTOR,
Walter S. Aiken,
BY
ATTORNEY.

Patented Dec. 1, 1936

2,062,737

UNITED STATES PATENT OFFICE 2,062,737

PAPER CUTTING APPARATUS

Walter S. Aiken, Lee, Mass., assignor to The Clark-Aiken Company, Lee, Mass., a corporation of Massachusetts Application November 27, 1935, Serial No. 51,877

3 Claims. (Cl. 164—68)

This invention relates to improvements in apparatus for cutting a web or webs of material, such as paper, into successive lengths to provide separate sheets.

One object of the invention is the provision of a machine of the class described which is characterized by a novel combination and arrangement of parts adapted and arranged for the efficient and accurate cutting of a web of paper or the like into sheets of various lengths.

Another object of the invention is the provision of a machine of the class described wherein the web to be cut is fed continuously through the machine in a certain level path or plane in which it is cut thereby to produce successive sheets at high speed in an efficient manner.

A further object of the invention is the provision of a machine wherein cutting edges of coacting cutting members cut the web transversely on a certain line which is adjustable in a plane substantially parallel to the plane of the web for positioning at various angles relative to a line at right angles to the side edges of the web in order to accommodate and compensate for the shear effect and travel of the web during the cutting operation. In this way sheets having end or transverse edges at right angles to their side edges are produced and this facilitates the producing of sheets at high speed and which very closely approximate in length the finally trimmed sheets and avoids wasteful trimming heretofore necessary.

A further object of the invention is the provision of a machine wherein the sheets may be cut to various predetermined lengths, the cutting means being adapted for adjustment in speed relative to the means for feeding the web to be cut.

A further object of the invention is the provision of means whereby the web of material to be cut is moved or fed in an unwarped level plane to the coacting cutting members, thereby facilitating such high speed operation and accuracy of cutting as is desired in machines of the type to which the invention relates.

A still further object of the invention is the provision of a machine wherein one of a pair of relatively movable cutting or shear members acts at a substantial angle on the other so that it is possible to obtain the desired shearing action which in combination with certain self-sharpening features to be described facilitates efficiency and speed in operation as well as accuracy in the sheets cut from the web.

Various and numerous other novel objects and advantages of the machine of the invention will hereinafter more fully appear in connection with the accompanying description of the preferred form thereof, it being understood that various changes and modifications may be made therein without departing from the spirit and scope of the invention. In the drawings:

Fig. 2 is a longitudinal sectional view through the machine shown in Fig. 1;

Fig. 3 is a sectional elevational view on the line 3—3 of Fig. 2;

Fig. 6 is a plan view of the slide cylinder which carries a cutter knife;

Fig. 7 is a side elevational view of the cylinder shown in Fig. 6;

Fig. 8 is an enlarged sectional elevational view on the line 8—8 of Fig. 7 at an enlarged scale; and Fig. 9 is a diagrammatic plan view at a small scale to explain certain features of the invention.

Figure 1:
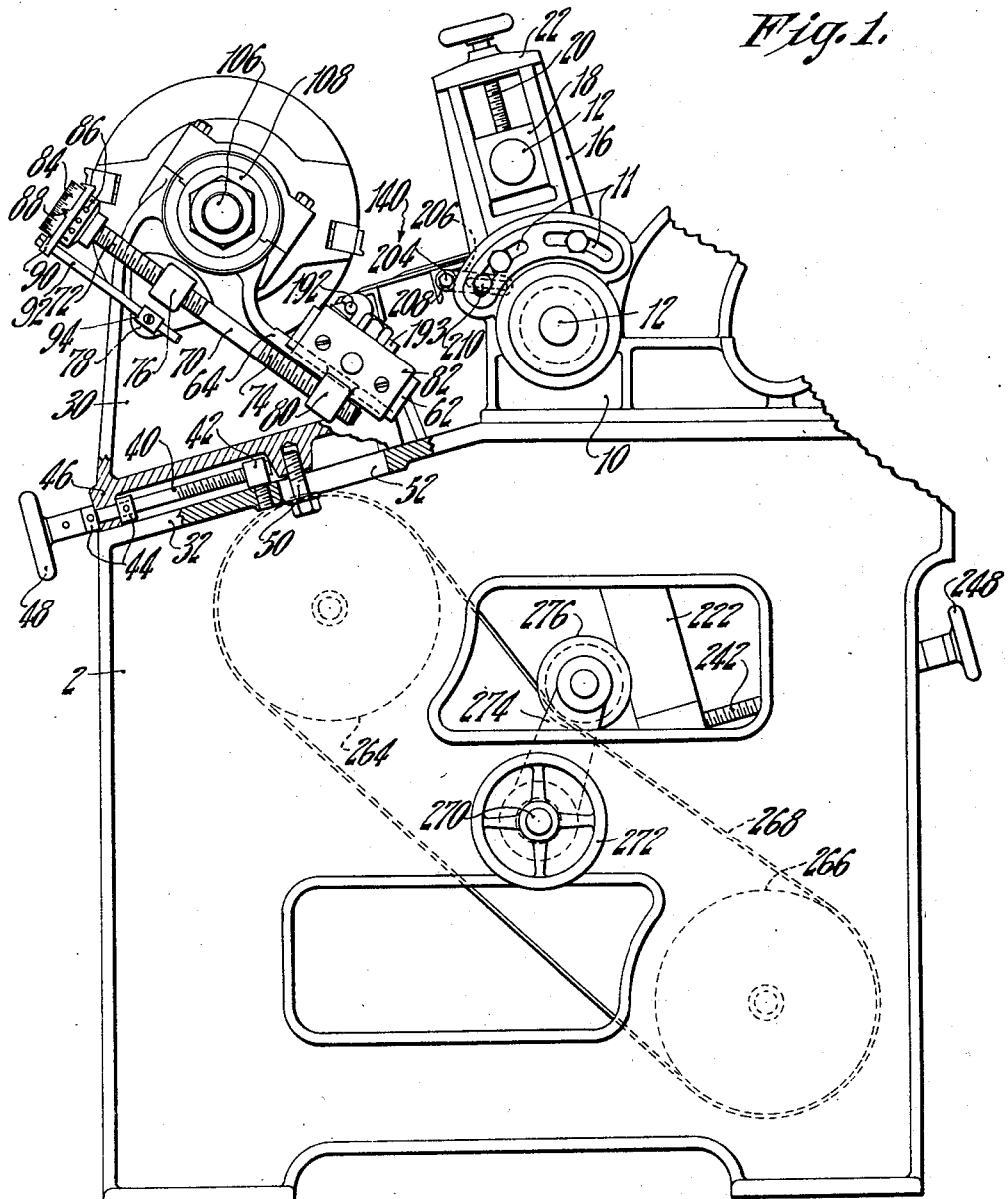
Fig. 1 is a side elevational view of an apparatus embodying the novel features of the invention.
Figure 4:
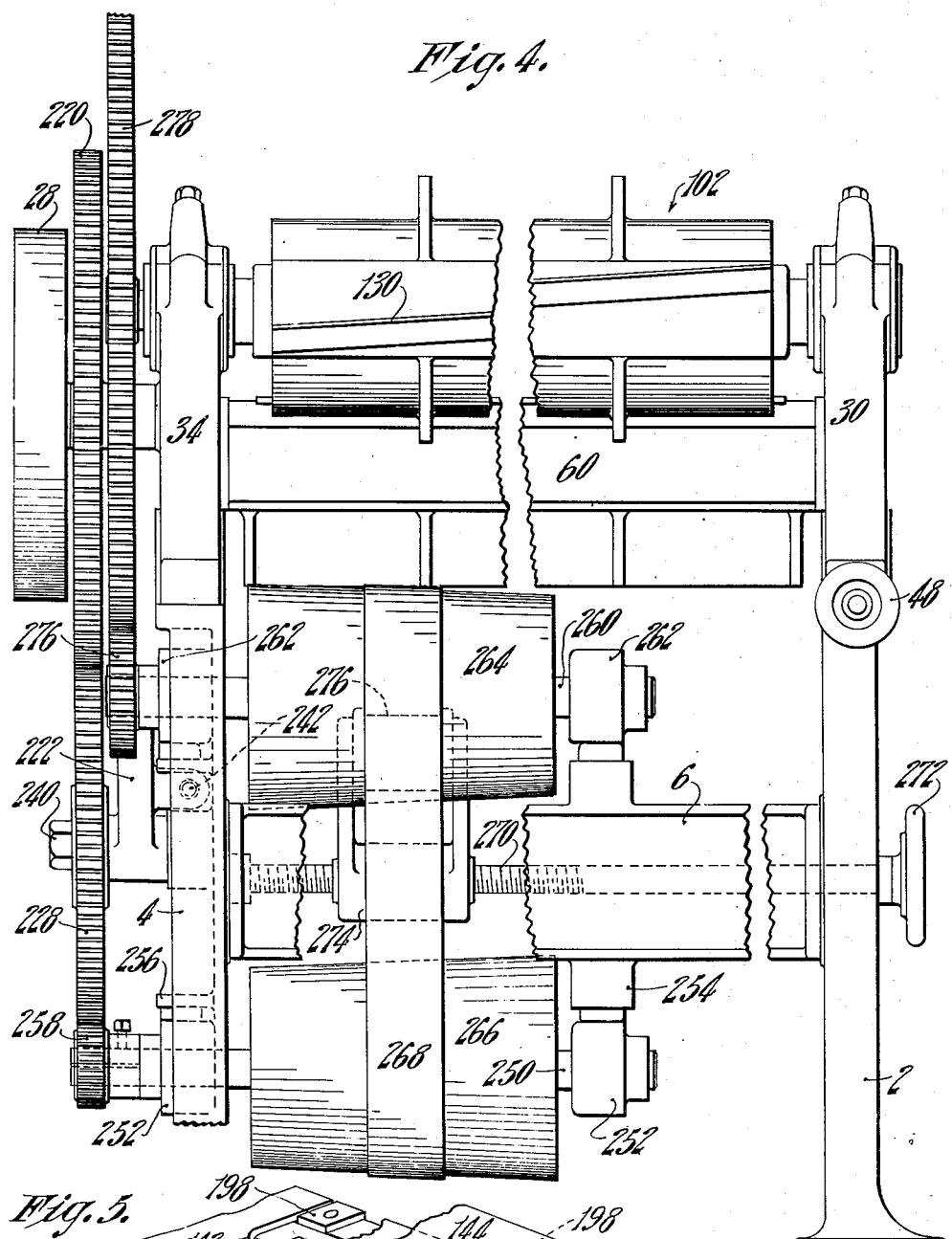
Fig. 4 is an end elevational view of the left-hand end of the machine shown in Figs. 1 and 2.

Referring now to the drawings more in detail, the invention will be more fully explained.

Forward and rear frame members 2 and 4 are provided and these may rest on the floor or a foundation so as to be supported thereby. The frames 2 and 4 may be connected by transverse members such as 6 and 8, shown more clearly in Fig. 2.

The frames 2 and 4 constitute a supporting structure for the various units and elements of the machine. Brackets such as 10 are mounted on the upper side of the frame structure and these have journalled therein a shaft 12 with which is associated a lower roll 14 which may become one of a pair of feed rolls for feeding the web of paper or the like into the machine.

The shaft 12 in the form of the invention shown is the driving shaft and brackets 16 extend upwardly from the members 10. These brackets 16 slidably receive bearings 18 which are moved up and down by screws 20 associated with caps 22.

An upper roll 24, which may be called a squeeze roll, constitutes the other one of the pair of rolls for feeding the paper into the machine and this has a shaft 26 which is journalled in the bearings 18. The roll 24 may have a yieldable covering thereon so that when it is held in contact with the lower roll 14 it will in association with said roll accurately feed a web of material, such as paper, into the machine.

A pulley wheel 28 is also carried by the shaft 12 and this may be belted to a suitable source of power whereby the machine is driven. Or, if desired, the shaft 12 may be connected as by a chain or other means to some source of power or it may be directly connected or geared to a motor shaft or the like.

A bracket 30 is slidably mounted on a flange part 32 of the forward frame or bracket 2. The flange 32 is preferably inclined, as shown in Fig. 1, so that the bracket 30 is adjustable as by sliding thereon in a plane which is in substantial parallelism with the plane or path of the movements of the paper as it travels from the rolls just described to the cutting mechanism.

A bracket 34, similar to the bracket 30, is mounted on a flange 36 of the rear frame 4 and this is arranged for pivotal movements relative thereto. That is, a pivot member 38 is associated with the bracket 34 by passing through a suitable opening in the flange 36 of frame 4. These brackets 30 and 34 have journalled therein what may be called a fly cylinder which carries a knife or shear and as the bracket 30 in the forward frame 2 is moved back and forth in the plane referred to the bracket 34 in the rear frame 4 is caused to swing on its pivot for purposes which will later be described.

An adjusting screw 40 has a threaded end as shown in threaded engagement with a nut 42 associated with flange 32. Collars 44 are provided on screw 40 at either side of a part 46 of bracket 30 and these are adapted to prevent longitudinal movements of the screw. A manually engageable part, such as a hand wheel 48, is provided on the screw so that the screw may be rotated and move the bracket 30 back and forth on the flange 32.

A lock bolt 50 is in threaded engagement with bracket 30 and this may be disposed in a slot 52 of flange 32. The bolt 50 is arranged for clamping the bracket 30 to the flange in any one of numerous positions of adjustment thereon.

A bed bar 60 is disposed transversely of the machine and is arranged and adapted for supporting in a rigid manner a relatively stationary shear or knife with which the shear or knife of the fly cylinder co-operates for the cutting or shearing action. On either end of this member 60 there are blocks 62 which slide on finished surfaces or flanges 64 of the brackets 30 and 34. In the form of the invention shown, the flanges 64 are inclined so that the said bar 60 may move towards and away from the axis of rotation of shaft 106 of the fly cylinder presently to be described.

Means for moving the bed bar 60 back and forth relative to the brackets 30 and 34 consist of screws 70 which have threaded portions 72 and 74. These screws have their threaded portion 72 in threaded engagement with nuts 76 associated with brackets 78 which are affixed to the brackets 30 and 34. The other threaded portions 74 of the screws are in threaded engagement with nuts 80 associated with plates 82 which are affixed, as by screws or the like, to the parts 62.

Parts 84 on the outer end of the screws may carry indicia and the screws 70 may be rotated in one direction or the other as by means of a tool inserted in recesses 86 associated with the parts 84. Pointers 88 are carried by rings 90 which are supported by rods 92 and are clamped in lugs 94 associated with the brackets 78.

Since the adjusting mechanism just described is employed in connection with both the brackets 30 and 34, it will be seen that the bed bar 60 may be adjusted at its opposite ends.

A stationary knife 100 having a forward cutting or shearing edge as shown in Fig. 8 is affixed to the bed bar 60. The fly cylinder 102, previously referred to, and shown in Figs. 2, 4, 6, 7 and 8 is generally tubular in form and has heads 104 at opposite ends in which are fixed trunnions or shafts 106.

The shafts 106 are rotatable in bearings 108 associated with the brackets 30 and 34 and the fly cylinder 102 has one or more longitudinally extending portions 110 along the side or sides thereof which carry in their peripheral faces, longitudinally extending grooves.

These grooves or slots are angularly disposed relative to the plane of the axis of the cylinder, for a purpose which will presently appear, and therein there is disposed a fly bar 112, a cross section of which is shown more clearly in Fig. 8. A plurality of spaced and externally threaded hollow bolts 114 are in threaded engagement with bar 112 and washers 116 are disposed between the inner ends of the members 114 and the rear side of the fly bar 112.

Bolts 118 extend through the hollow bolts 114 and fly bar 112 and they are provided with heads 120 which may be countersunk in the forward part of the fly bar. Threaded ends 122 of the bolts 118 are threadedly received in nuts 124 and thus the fly bar may be accurately positioned and rigidly and securely held in the fly cylinder, the fly bar being drawn against the bolts 114 by the bolts 118.

A cutter knife or shear 130 is disposed on the outer face of the fly bar 112 and a shoulder 134 is provided against which the upper edge of the cutter knife may abut. In this way the cutter knife is more or less reinforced for the cutting or shearing action. The lower end of the cutter knife is provided with a cutting edge as indicated in Fig. 8 and is arranged to co-operate with the cutting edge of the stationary knife 100.

The cutter knife 130 may be secured to the fly bar 112 by means of screws 136 which, as shown, are arranged therealong in spaced and preferably staggered relation.

It is desired, according to the preferred form of the invention, that one of the co-operating knives be made of material which is relatively soft as compared with the other. For example, the knife 130 in the fly cylinder may be made of cast iron while the stationary knife 100 may be made from steel which is suitably heat treated. Thus in the operation of the machine, the knife 100 tends to maintain the cutting edge of knife 130 in a sharpened condition at all times or, in other words, the knife 130 may be said to be self sharpening.

It will be seen that by reason of this arrangement, there results a greater degree of efficiency in operation of the machine since it is not necessary to stop for knife replacement or sharpening. Furthermore, where the knife 130 is of iron, as described, it is possible to obtain a very desirable shearing action which is not possible where both the knives are of steel since in the latter case, the angularity of the knives with reference to the planes of the axes of rotation of the fly cylinder must be much less than may be employed in the construction with which this invention is concerned.

The arrangement described in connection with

Fig. 1 whereby the bed bar 60 may be adjusted facilitates adjusting within extremely fine limits so that the stationary knife or shear may be set in the desired position relative to the knife or cutter of the fly cylinder. In operation, the material being cut, such as paper, is directed between the co-acting rolls 14 and 24 and onto the stationary knife 100 in such a manner that the material is properly supported in a flat unwarped position.

This is accomplished by means of a support or apron indicated generally by 140 and consisting of a lower plate 142 and an upper plate 144. The lower plate 142 is associated with the bed bar and stationary knife and the upper plate 144 is associated with the bracket 10 so that as bracket 30 is moved the plate 142 is moved therewith in relation to the upper plate 144.

Figure 5:
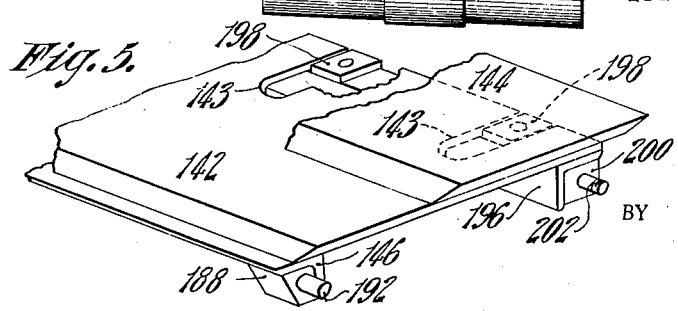
Fig. 5 is a perspective view of a portion of the paper-supporting plate to explain certain details of construction.

To accomplish this, the lower plate 142 has its forward end secured to a transverse member 146 which may be in the form of an angle. This angle (see Fig. 5) has blocks such as 188 in opposite ends thereof which have relatively short studs 192. The studs 192 are received in brackets 193 provided on blocks 62 whereby the forward end of the bottom plate 142 is secured to the bed bar.

An angle 196 is disposed below the rear end of top plate 144 and it is spaced therefrom and from the under side of the bed plate by a block 198 which is of sufficient size to allow plate 142 to slide between the plate 144 and the top of the angle 196. The bottom plate 142 is slotted as at 143 to permit relative sliding movements of the plates.

Blocks 200 are provided in opposite ends of angle 196 and they carry studs 202. Links such as 206 are secured to the studs 202 by nuts, such as 208, and are adjustably secured in slots 11 provided in brackets 10 by means of bolts 210.

It will be seen that the brackets 30 slide on the forward frame 2 and at the same time the rear bracket 34 swings on the rear frame 4. Also, the plates 142 and 144 are movable relative to one another while at the same time providing a support for the paper being delivered to the cutting mechanism by the rolls.

The machine is, as stated, adapted for cutting the web into sheets of various lengths and so the parts are accordingly adjustable for the purpose of varying the length of the cuts. According to another feature, the web of paper may be delivered by the rolls at a constant and uniform speed so that by changing or varying the speed of rotation of the fly cylinder, the length of sheets may be varied.

In the form of the invention shown, the shaft 12 or one of the coacting rolls is employed as the drive shaft for the machine and certain driving connections between this shaft and the fly cylinder are provided. This is so arranged that the speed of the fly cylinder may be varied relative to the peripheral or lineal speed of the roll carried by the shaft 12. This driving mechanism will be more fully hereinafter described.

It will be appreciated that the paper is delivered by the rolls across the apron 140 at a certain lineal speed and that there is some interval of time elapsing while the angularly disposed knife or shear of the fly cylinder engages the stationary knife from end to end. During this interval of time, the paper is, of course, being fed forwardly by the rolls. It is desired that the cut be at right angles to the marginal edges of the web.

In reference to Fig. 9 a web of paper is represented by W and the paper is being fed to and through the co-acting knives in the direction of the arrow shown. Because the rear bracket is pivoted and the forward bracket 30 is adjustable back and forth, the cutting edge of the stationary knife 100 and the cutting line may be positioned at such an angular position with reference to the edges of the web as to compensate for the travel of the web and angle of the knife on the fly cylinder during the cutting operation. Numerous and various angular positions such as indicated by A in Fig. 9 are possible and thereby it is possible to at all times provide end cuts correctly related to the side edges of the web and thereby produce substantially rectangular sheets having straight edges. Since the adjustment is made in a plane corresponding substantially to the plane of the paper the paper is allowed to travel in a flat unwarped path which makes for efficiency, speed and uniformity of results.

The driving mechanism will now be described. A driving gear 220 is fixed to shaft 12 and an arm 222 is swingable on said shaft. On the lower end of the arm 222 there is a hub 224 on which is rotatable, by means of a ball bearing assembly 226, a gear 228 in mesh with the gear 220.

A bracket 230 has a slot 232 therein and the bracket is held against lugs 234 of frame 4 by means of bolts or the like 236. A nut 238 is slidable along the slot 232 of bracket 230 and this receives the threaded end of a clamp bolt 240.

The arm 222 may swing back and forth and carry gear 228 about the gear 220 and is secured to the bracket in various positions of adjustment by means of bolt 240 and nut 238.

A rod 242 has a threaded inner end in engagement with arm 222 and is rotatable in a bearing 244 which is mounted for swinging movements, as by a stud 246, extending into frame 4. A manually engageable member such as a hand wheel 248 may be carried by the outer end of rod 242 for rotating the same and in this way the arm 222 may be moved back and forth.

A lower transverse shaft 250 is mounted for rotation in bearings 252 which are carried on brackets 254 and 256 associated with the cross member 8 and the rear side frame 4. A gear 258 is provided on the end of shaft 250 and this is in mesh with gear 228.

Gear 258 is what may be called a change gear and it, as well as other gears of different diameters, may be carried by shaft 250 so that the transverse shaft 250 is driven at various speeds relative to shaft 12. The shaft 250 drives mechanism to be described whereby, by changing the gear 258, it is possible to drive the cylinder 102 at various speeds relative to shaft 12.

An upper shaft 260 is journalled in bearings 262 associated with transverse rail 6 and side frame 4. A cone pulley 264 affixed to shaft 260, and a cone pulley 266, which is affixed to shaft 250, are connected by an endless belt 268.

With this arrangement, as the belt 268 is moved back and forth from end to end of the pulleys, the relative speeds of shaft 250 and 260 may be varied so that the speed of the fly cylinder may be controlled and varied within the desired fine limits. In this way is brought about the most efficient and accurate cutting operation.

A transverse adjusting shaft 270 is journalled for rotation in the frame and this may have a manually engageable part, such as a hand wheel 272 on its outer end. A pulley arm 274 receives a threaded part of the shaft 270, as shown.

The arm member 274 carries a flanged pulley 276. That is to say, the shaft 270 is rotated in one direction or the other and the member 274 is moved thereby in either one direction or the other so that the flanged pulley will shift the belt back and forth relative to the cone pulleys. A gear 276, which is affixed to shaft 260, is in mesh with a gear 278, which in turn may be affixed to the shaft 106 of the fly cylinder 102.

From the foregoing, it will be observed that the fly cylinder may be rotated at some desired predetermined speed relative to the speed of the rolls 24 and 14 and consequently relative to the lineal speed of the paper being fed forwardly by the rolls. Thus, by means of the cone pulley, it is possible to obtain very accurate adjustment of the relative speeds to thereby facilitate the making of successive cuts and provide successive sheets of predetermined lengths which may vary in length between wide limits.

It will also be observed that the co-operating cutter, cutting knives or shear knives are arranged for the most efficient operation in that one knife is self-sharpening, so-called, to eliminate the necessity of stopping the machine for the purpose of conditioning the knife. Also, by reason of the particular nature of the knives and their operative functions, the shearing action may be substantial which is desired in machines of this kind both from the standpoint of efficiency, production and speed of operation.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. A machine for cutting a continuously moving web transversely into successive sheets comprising in combination, a support, a pair of co-operating feed rolls for feeding a web, an adjustable cutting unit having one side pivoted to said support and its other side slidable thereon for movements in a certain plane, a stationary member and a relatively rotatable member on the cutting unit, co-operating cutting elements on said members for cutting a web on a certain transverse line, and supporting means extending from said cutting line to said rolls for supporting a web parallel to said certain plane from said cutting line to said rolls whereby a web is supported in a flat level plane between said rolls and cutting elements.

2. A machine for cutting a continuously moving web transversely into successive sheets comprising in combination, a support, a pair of co-operating feed rolls for feeding a web, an adjustable cutting unit having one side pivoted to said support and its other side slidable thereon for movements in a certain plane, a stationary member and a relatively rotatable member on the cutting unit, co-operating cutting elements on said members for cutting a web on a certain transverse line, and supporting means extending from said cutting line to said rolls for supporting a web parallel to said certain plane from said cutting line to said rolls whereby a web is supported in a flat level plane between said rolls and cutting elements, the said supporting means including relatively slidable members secured to said stationary member and to said support adjacent said rolls.

3. A machine for cutting a continuously moving web transversely into successive sheets comprising in combination, a pair of co-operating rolls for feeding a web forwardly from the bite thereof in a flat plane, cutting mechanism having relatively movable members provided with co-operating cutting members for cutting a web along a cutting line, means for moving said cutting mechanism in parallelism with said flat plane into various positions of adjustment whereby the cutting line may be positioned at various angles relative to a line at right angles to the marginal edges of a web fed from the bite of said rolls, and supporting means for a web between said rolls and cutting members having relatively movable members movable as said cutting mechanism is moved.

WALTER S. AIKEN.